United States Patent
Forslöw

(10) Patent No.: US 8,229,417 B2
(45) Date of Patent: Jul. 24, 2012

(54) METHOD AND ARRANGEMENT FOR LOCATING AREAS HAVING POOR RADIO COVERAGE

(75) Inventor: Mats-Ola Forslöw, Göeborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 490 days.

(21) Appl. No.: 12/520,365

(22) PCT Filed: Dec. 12, 2006

(86) PCT No.: PCT/SE2006/050575
§ 371 (c)(1),
(2), (4) Date: Jun. 19, 2009

(87) PCT Pub. No.: WO2008/073012
PCT Pub. Date: Jun. 19, 2008

(65) Prior Publication Data
US 2010/0048199 A1 Feb. 25, 2010

(51) Int. Cl.
*H04W 24/00* (2009.01)
(52) U.S. Cl. .......... 455/423; 455/422.1; 455/456.1; 370/241.1; 370/245
(58) Field of Classification Search .......... 455/422.1, 455/423, 456.1–457, 404.1–404.2; 370/241–245, 370/216–228
See application file for complete search history.

(56) References Cited

U.S. PATENT DOCUMENTS

| | | | |
|---|---|---|---|
| 2005/0107095 A1* | 5/2005 | Samuel | 455/456.5 |
| 2005/0136911 A1* | 6/2005 | Csapo et al. | 455/423 |
| 2006/0075131 A1* | 4/2006 | Douglas et al. | 709/230 |

FOREIGN PATENT DOCUMENTS

JP 2001313972 A * 11/2001

* cited by examiner

*Primary Examiner* — Ajit Patel
*Assistant Examiner* — Erica Navar

(57) ABSTRACT

A method for determining tentative locations for areas with poor radio coverage in a cellular communication system comprises the step of keeping position-related data of connected user equipment's updated in a network part of the communications system. The method further comprises detection of an accidental loss of connection to a user equipment. The position-related data of such a dropped user equipment is logged as a response to a detection of such accidental loss of connection. The logged position-related data for a multitude of accidental loss events are compiled as a quantity based on the number of accidental losses of connection as a function of the position-related parameter. The method further comprises identification of a tentative location for an area with poor radio coverage by statistical evaluation of that quantity. An arrangement for determining tentative locations for areas with poor radio coverage is also presented.

30 Claims, 9 Drawing Sheets

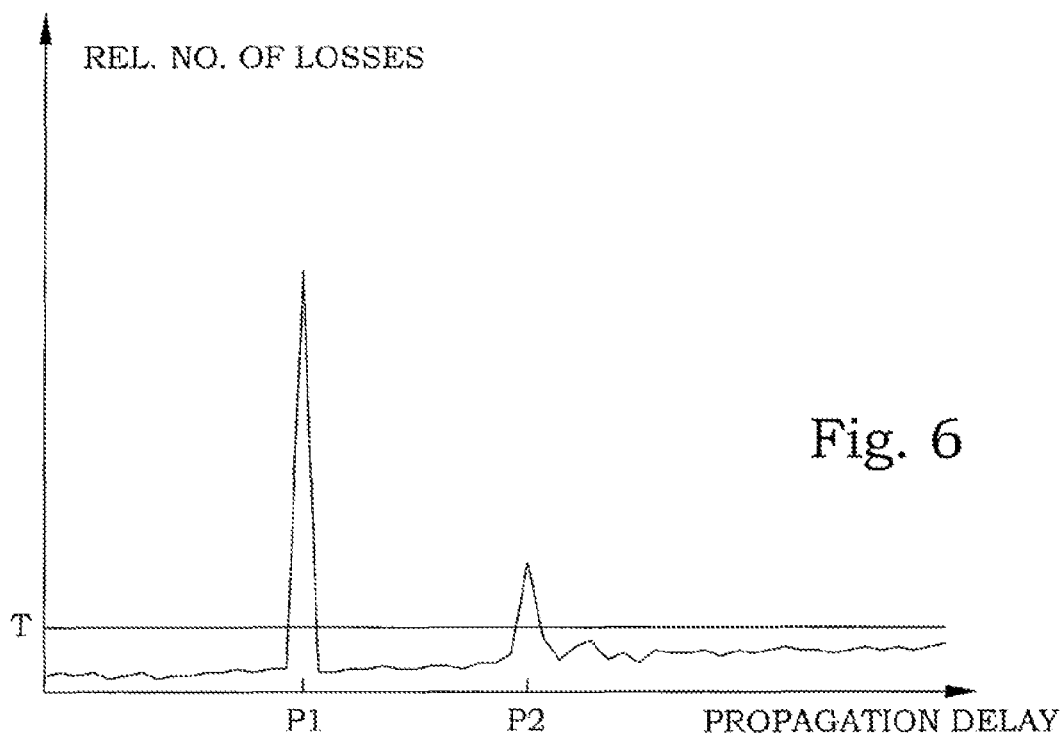
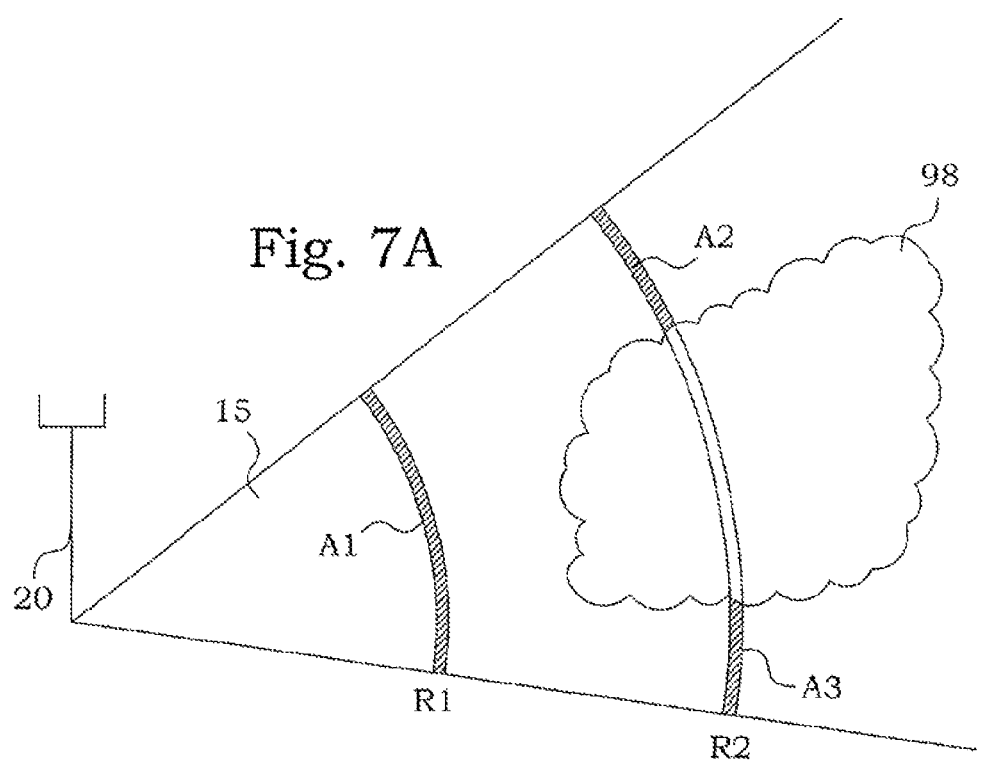

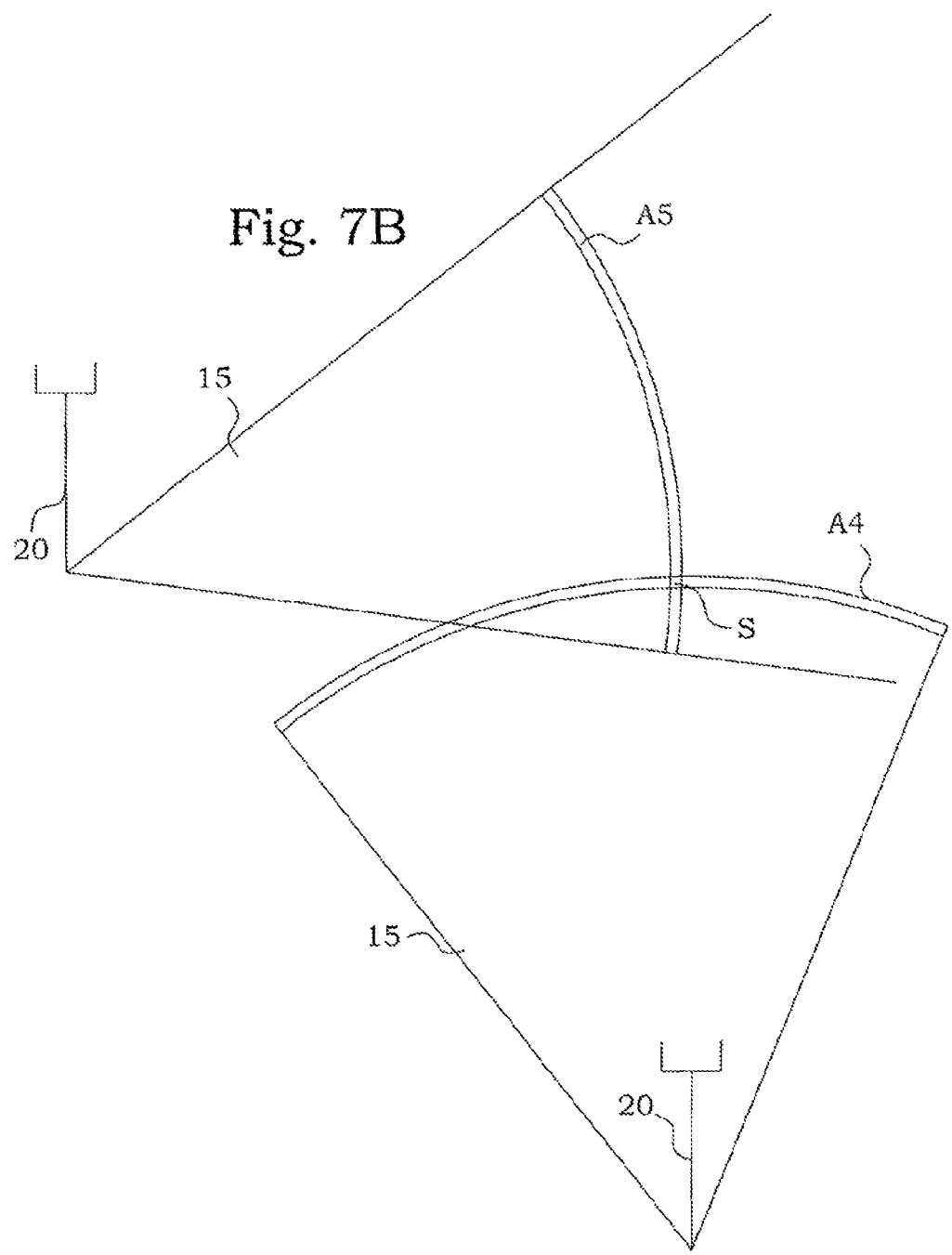

METHOD AND ARRANGEMENT FOR LOCATING AREAS HAVING POOR RADIO COVERAGE

TECHNICAL FIELD

The present invention relates in general to arrangements and methods related to operation and maintenance of cellular communication systems, and in particular to arrangements and methods assisting in increasing radio coverage.

BACKGROUND

An important service quality issue in cellular communication systems is to provide complete and reliable radio coverage of the geographical area that is intended to be covered by the cellular communication system. Cellular communication systems are typically optimized prior to commercialization to give an as good radio coverage as possible. However, since surroundings within the coverage area may change with time, coverage may also change. Adjustments of antennas, beams and/or emission powers are used to continuously minimize areas having poor radio coverage, typically on a network level. These efforts have been quite successful and today, 3G networks (Third generation mobile networks) has reached and stabilized at a drop rate of around 0.7-1.0%.

Further improvements call for cell level trimming or re-planning, which is more expensive and tedious. Such functionality is often referred to as O&M systems (Operation & Maintenance). A commonly adopted view-point is that work aiming to decrease the drop rate even further requires a very large effort in relation to the potential improvements. Since the drop rate is at a fairly low level today, further drop rate combat therefore has been considered as less important for the network operators, since such measures would lead to high costs.

A typical approach for further improving radio coverage is to visit the equipment sites and cell areas and actually measure the radio conditions at different sites. However, since cells, at least in rural areas can be very large indeed, in some cases even up to 10 000 km$^2$, it is naturally very time consuming and costly to cover such large areas manually when searching for areas of poor coverage.

However, a continued call drop combat has clear advantages. The problem is that most prior art coverage tuning is based on a resource-demanding "blind" search for poor coverage areas.

In the published U.S. patent application US 2005/0136911, an apparatus and method for mobile station-assisted optimization of a wireless network are disclosed. Mobile stations are equipped with GPS receivers and are therefore continuously aware of their position. Radio signal parameters are stored in the mobile station and reported to a coverage server in the core network together with corresponding position information. In particular, when communication links to the wireless network are dropped, the mobile station reports the position for such a drop. The information is compiled in the coverage server and poor coverage areas may be detected, as well as fault functioning mobile stations.

The solution of US 2005/0136911 gives at least theoretically a good overview of good and bad coverage areas. However, a number of severe drawbacks are present. The solution relies on the active action of mobile stations, which calls for updated mobile stations. In particular, to reach the top resolution, GPS receivers have to be provided in the mobile stations, which receivers increase the cost for each mobile station tremendously. This makes it practically impossible to introduce such equipment as standard equipment in mobile stations. Furthermore, the mobile station performs a large part of the processing, some of it operating continuously, which increases the battery consumption. The reporting of the position data and/or signal parameters requires additional radio transmissions, also leading to increased battery consumption. The radio transmissions also consume available resources in the radio interface, leading to less traffic capacity. Furthermore, since mobile stations vendors are not typically allied with operators, there are small possibilities for the operators to influence the mobile station vendors to provide suitable mobile stations. Since the radio interface is standardized, the proposed solution needs substantial standardization efforts. Moreover, the overall solution requires a substantial and costly systemization and access network implementation.

A general problem with the solution of US 2005/0136911 is thus that the coverage improvements are results entirely dependent of active operations performed mainly in the mobile stations.

SUMMARY

A general object of the present invention is to achieve information assisting in locating tentative areas with poor radio coverage in a cellular communication system without actively involving mobile stations and/or the radio interface. A further object of the present invention is to achieve such information without any large needs for standardization changes or large systemization efforts.

The above objects are achieved by methods and arrangements according to the enclosed patent claims. In general words, in a first aspect, a method for determining tentative locations for areas with poor radio coverage in a cellular communication system comprises the step of keeping position-related data of connected user equipments updated in a network part of the communications system. The method further comprises detection, in the network part of the communication system, of an accidental loss of connection to a user equipment. The position-related data, available in the network part, of such dropped user equipment is logged as a response to a detection of such accidental loss of connection of the dropped user equipment. The logged position-related data for a multitude of accidental loss events are compiled as a quantity based on the number of accidental losses of connection as a function of the position-related parameter. The method further comprises identification of a tentative location for an area with poor radio coverage by statistical evaluation of that quantity.

According to a second aspect of the present invention, a network part arrangement for assisting in providing tentative locations for areas with poor radio coverage in a cellular communication system comprises means for keeping position-related data of connected user equipments updated. The network part arrangement further comprises a detector of accidental loss of connection to a user equipment and means for logging position-related data. The means for logging position-related data is connected to the means for keeping position-related data updated and the detector. The means for logging position-related data is arranged for logging the position-related data of a dropped user equipment as a response to a detected accidental loss of connection of the dropped user equipment.

According to a third aspect of the present invention, a cellular communication system node comprises an arrangement according to the second aspect.

According to a fourth aspect of the present invention, a cellular communication system comprises a node according to the third aspect.

An advantage with the present invention is that assisting information about tentative poor radio coverage locations are achieved by active actions only within the network part of a cellular communication system. This facilitates implementation and does not have to rely on assistance from users or user equipment manufacturers/vendors.

BRIEF DESCRIPTION OF THE DRAWINGS

The invention, together with further objects and advantages thereof, may best be understood by making reference to the following description taken together with the accompanying drawings, in which:

FIG. 6 is a diagram illustrating a compilation of accidental loss of connection data;

FIG. 7A illustrates a cell having identified tentative areas for poor radio coverage;

FIG. 7B illustrates two cells having common identified areas for poor radio coverage;

DETAILED DESCRIPTION

Throughout the drawings, the same reference numbers are used for similar or corresponding elements.

Figure 1:
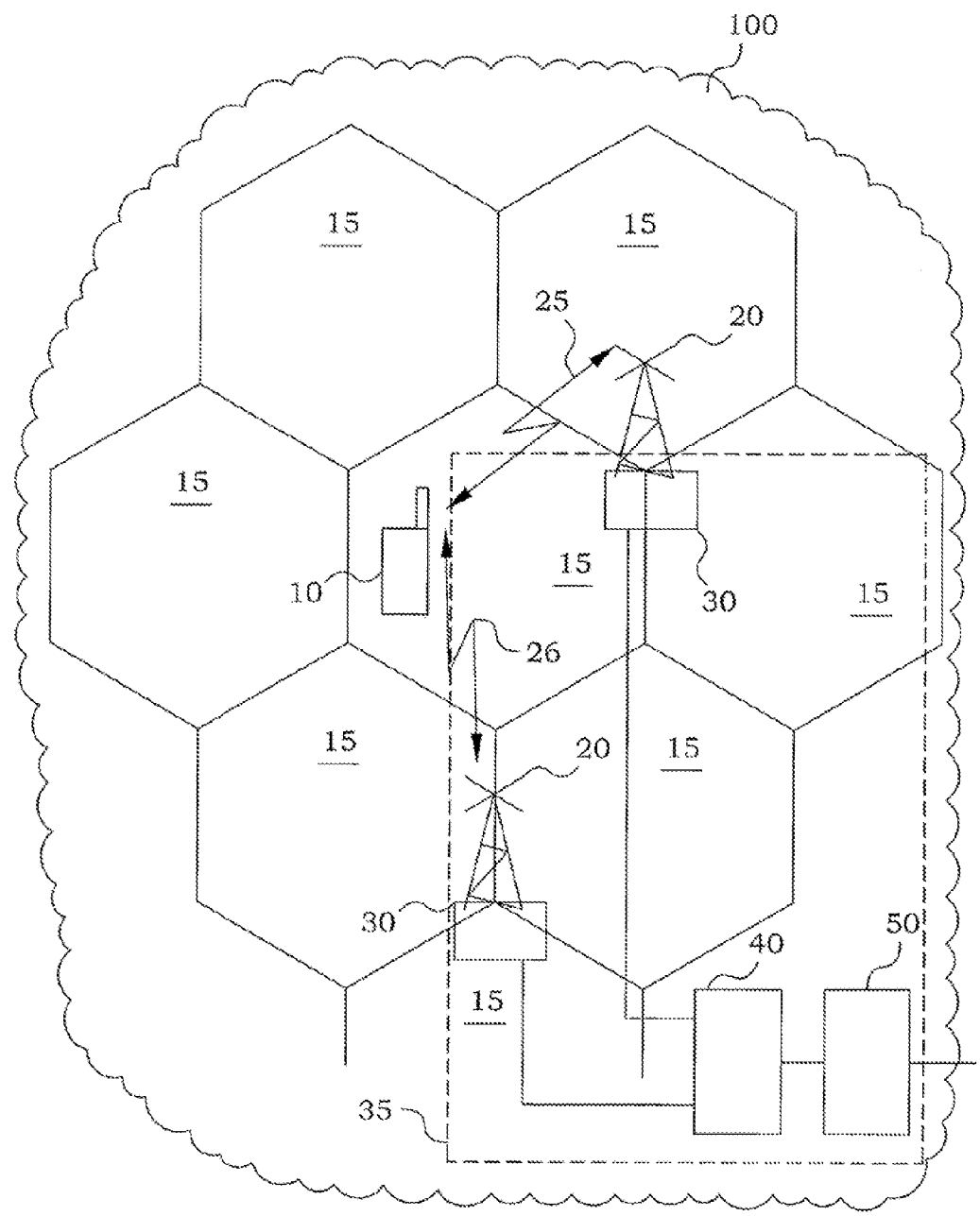
FIG. 1 is a block scheme of a general cellular communication system.

FIG. 1 illustrates a block scheme of an embodiment of a general cellular communication system 100. Base stations 30 are spread over the coverage area of the system and serves antennas 20, which in this embodiment are sectorized antennas. A cell 15 is associated with each sector of the antennas 20, as the area in which connection to the communications system preferably is performed through that particular sector. The base stations 30 are connected to a control node 40. The control node 40 is further connected to a core network 50 of the communications system 100. The core network 50 in turn typically comprises a large number of interconnected nodes (not shown).

A user equipment (UE) 10 is situated in the area covered by the cellular communications system 100. In the present disclosure, the terms "mobile terminal", "mobile station" and "user equipment" (UE) are used as synonyms. The UE communicates with the own base station 30 through signals 25. However, also signals 26 from and to neighbouring bas stations 30 may be possible to detect. If the neighbouring signals 26 are strong enough for supporting actual communication, the corresponding cell could be included in e.g. soft(er) handover.

The antennas 20, the base stations 30, the control node 40 and the core network 50 are in the present disclosure defined as a network part 35 of the communication system 100. The base stations 30 and the control node 40 as well as different nodes within the core network 50 are considered as cellular communication system nodes. Some communication-related tasks are solved within a single node. An arrangement for such activities therefore comprises parts within one and the same node. However, different communication functionalities may also be the result of cooperation between different nodes. An arrangement, e.g. a network part arrangement, may is such cases therefore comprise parts which are comprised in different nodes.

The present invention is applicable to many different cellular communication systems. However, for illustrating purposes, a WCDMA-system will be used as an example system. Note that the use of the WCDMA system as an example is not intended for limiting the protection scope thereto, and the protection scope should only be defined by the enclosed patent claims. The concept of the present invention can in principle be applied to any radio access technology, with possibility to track the timing between a base station and a mobile terminal at the network part of the system. Non-exclusive examples of possible used standards are GSM (global system for mobile communications), TDMA (Time division multiple access) (IS-136) and cdma2000 (IS-95) (CDMA=code division multiple access) or methods based on OFDM (Orthogonal Frequency Division Multiplexing) techniques.

Figure 2:
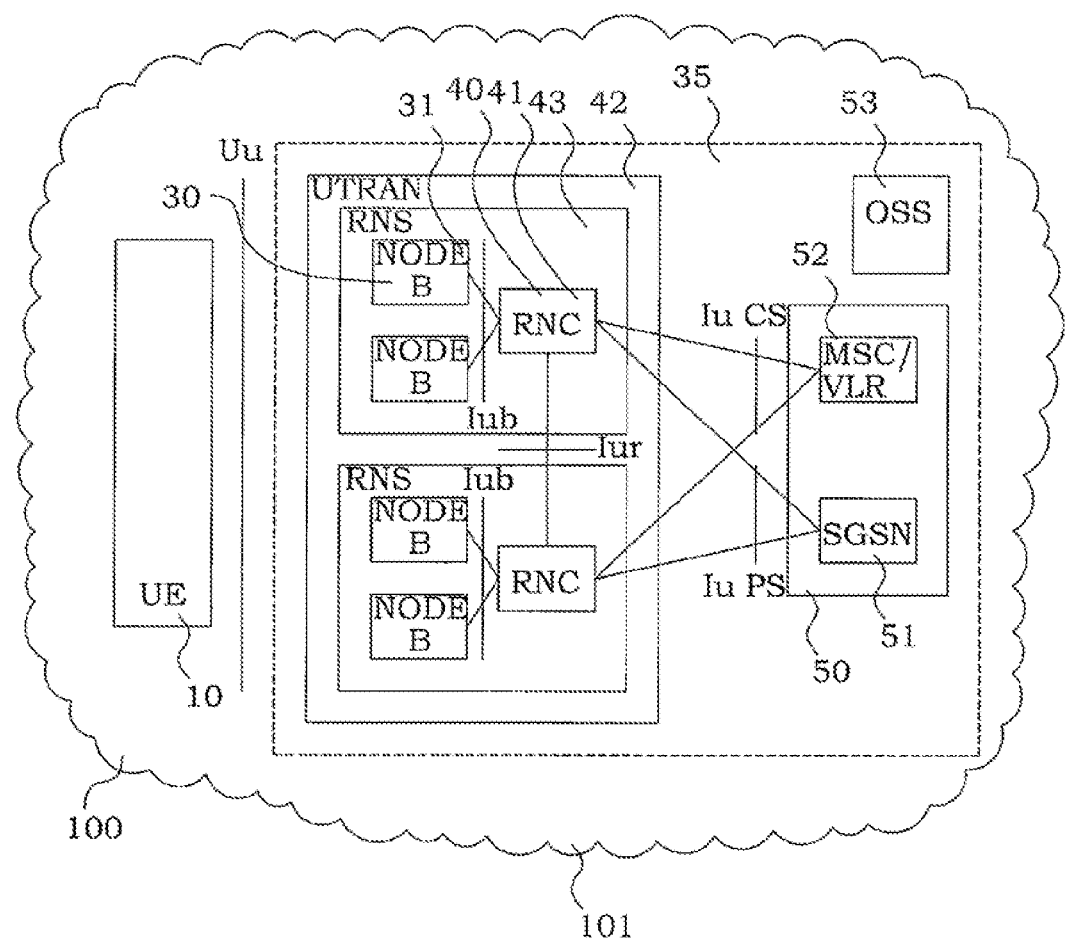
FIG. 2 is a block scheme of a WCDMA communication system.

FIG. 2 illustrates an architecture of a communication system 100, in this example a WCDMA (Wideband Code Division Multiple Access) communication system 101. A UE 10 communicates over a radio interface with a base station (BS) 30, in the present example a node B 31. The base station 30 may be named differently in other systems, e.g. a radio base station (RBS), or bas station transceiver (BST). One or several node B's 31 are connected to a control node 40, in this example a radio network controller (RNC) 41. The control node 40 may be named differently in other systems, e.g. a base station controller (BSC). The RNC 41 and the node B's 31 connected thereto constitutes a radio network subsystem (RNS) 43. One or several RNS's 43 together constitutes an UTRAN (Universal mobile telecommunication system terrestrial radio access network) 42. The RNC's 41 communicates further with the core network 50, and in particular to nodes, such as MSC/VLR (Mobile services switching centre/visitor location register) nodes 52 or SGSN (Serving general packet radio system support node) nodes 51. O&M functionalities are typically supported by an OSS (operations support system) node 53.

Figure 3:
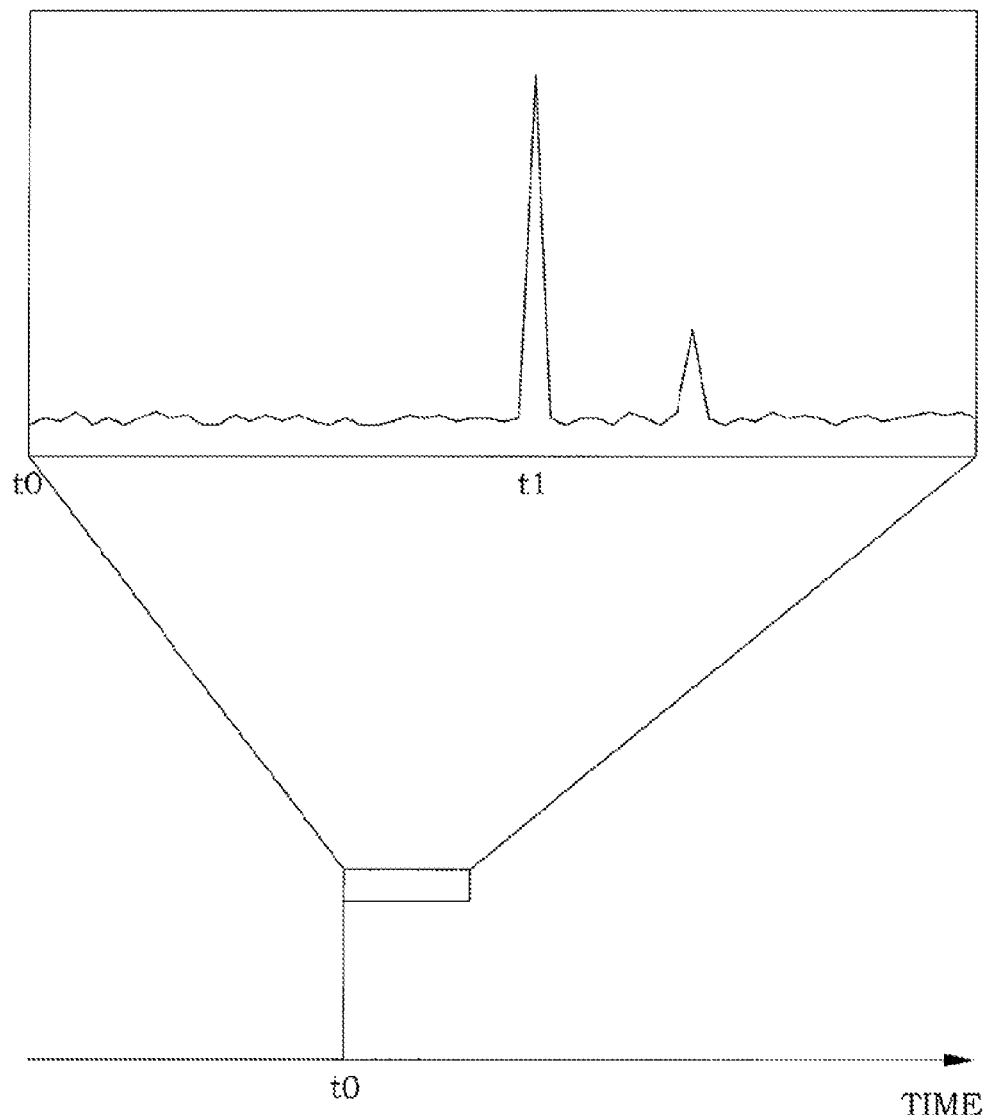
FIG. 3 is a diagram showing a search window for propagation delays.

When a node B communicates with a UE, downlink signals are sent from the node B to the UE and likewise, uplink signals are sent from the UE to the node B. Radio propagation in the uplink as well as downlink direction is characterized by propagation time, multiple reflections, diffractions and attenuation. In order to be able to correctly interpret any received signals, a propagation delay has to be compensated for. A baseband processor in the node B keeps track of propagation delays to the different UE's connected to the node B. Each UE is associated with a certain synchronizing window, within which tracking is performed to find the actual signal, see FIG. 3. Different methods and arrangements for multipath diversity reception are also typically available. The time position of the synchronizing window t0 is continuously updated, and the time position of the strongest energy peak t1 relative the synchronizing window is known, which means that the uplink baseband processing gives updated information of propagation delay to each UE. The synchronization window and thereby the propagation is given in coding chips. In WCDMA, the chip duration at 3.84 Mcps is 0.26 μs.

Figure 4:
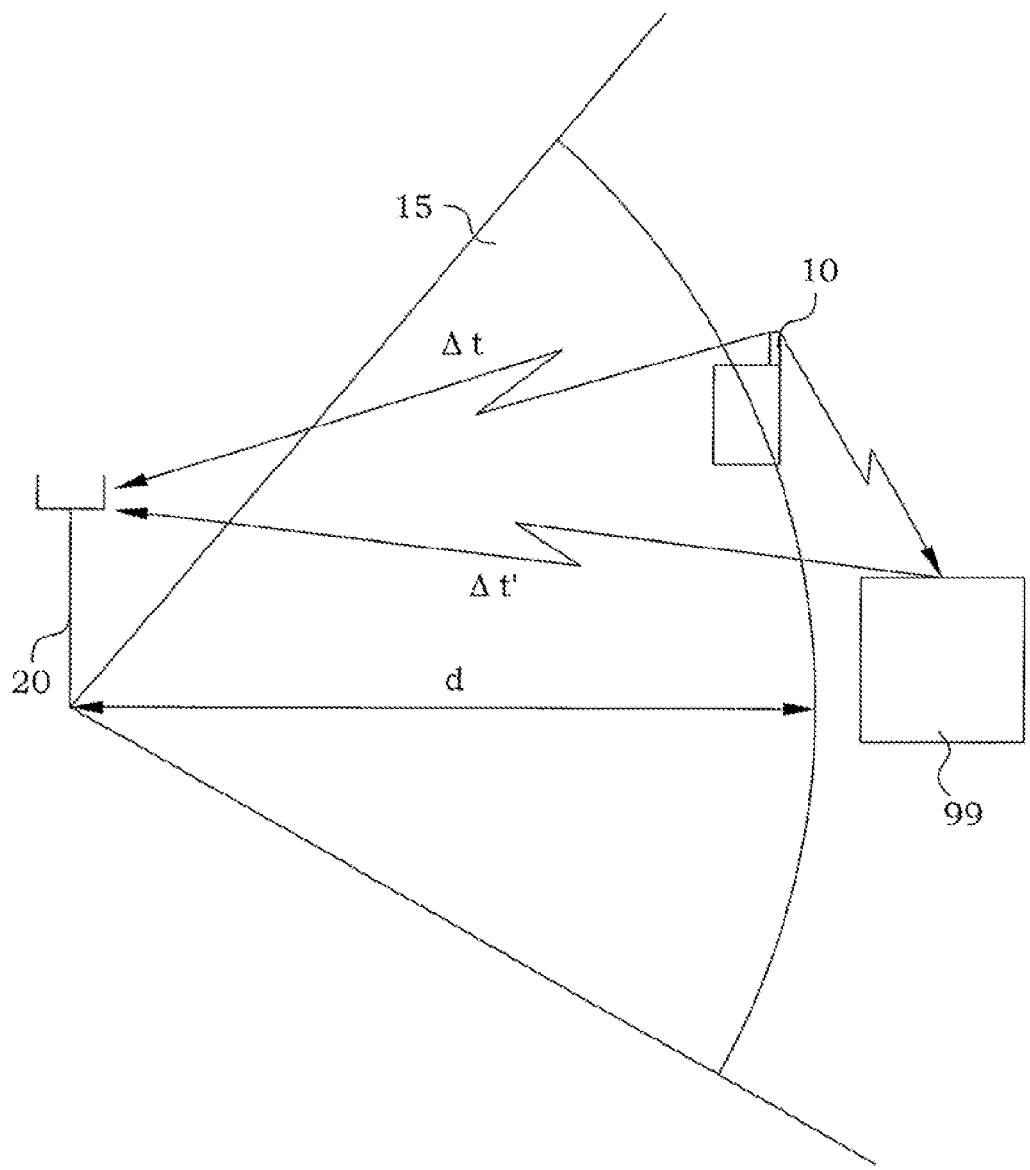
FIG. 4 illustrates the relation between propagation paths and propagation delay.

As illustrated in FIG. 4, the propagation delay Δt has a direct correspondence in distance d. Since radio signals travel with the speed of light, there is a direct correspondence between traveled time and traveled distance. The baseband processor and therefore the base station have always updated position-related data to all UE's connected to the base station. The traveled distance of the radio signal is in the typical case the shortest distance between the UE and the base station antenna. A resolution of 1 chip at 3.84 Mcps rate then corresponds to 78 meters. In some cases, the situation may be more complex, if e.g. multipaths are possible. In FIG. 4, a radio signal may e.g. reflect against a building 99 and then arrive at the antenna. Another delay Δt' will then be detected for that signal. In most cases, the direct path is the strongest one, and if detected always the first one. In other words, in a multipath situation, the smallest detectable propagation delay constitutes a maximum limit for the true direct path delay. The important conclusion is, however, that the base station always has recent position-related data concerning all UE's connected to the base station.

The present invention presents a novel O&M statistics tool to pinpoint specific intra-cell problems areas. Every time a call drops, its last known "position" is logged by position-related data available in the network part of the communication system. Call drops are in the present disclosure limited to an accidental loss of connection to a mobile station as a result of radio failure. In particular such a radio failure may be an uplink layer one synch loss or downlink layer two retransmission time out. The "position" is the case of using the propagation delay the physical distance between the MS and the serving radio base station antenna.

All position-related data are collected, e.g. in a PDF counter (probability density function) with highest possible resolution. For the 3 GPP WCDMA standard a reasonable resolution is one single coding chip, corresponding to 78.125 meters. Possibly, a resolution of ½ chip may be available in special situations. When sufficient statistical data has been collected, one can easily detect if there are any "positions" with abnormally high drop concentration. The detection can be manual or automized. The precision of the locator is likely to be a circular strip with a width of less than 200 meters. The positioning can also be improved (circumferentially) by means of thinner antenna beams. This can be accomplished either by (higher) sectorization or electronical beam forming. For example, changing from a 3-sector site to a 6-sector means the nominal beam angle goes from 120 degrees to 60 degrees. Beam forming has yet an advantage in that it can be performed in real time or as a remotely controlled procedure.

The benefit from such a locator is obvious. Instead of having to search through an entire cell area for locating poor coverage spots, such a search can be limited to a 200 m wide strip. For a large cell of a radius of 200 km, the tentative "location" for poor radio coverage is limited to 0.1% of the entire cell area.

Figure 5:
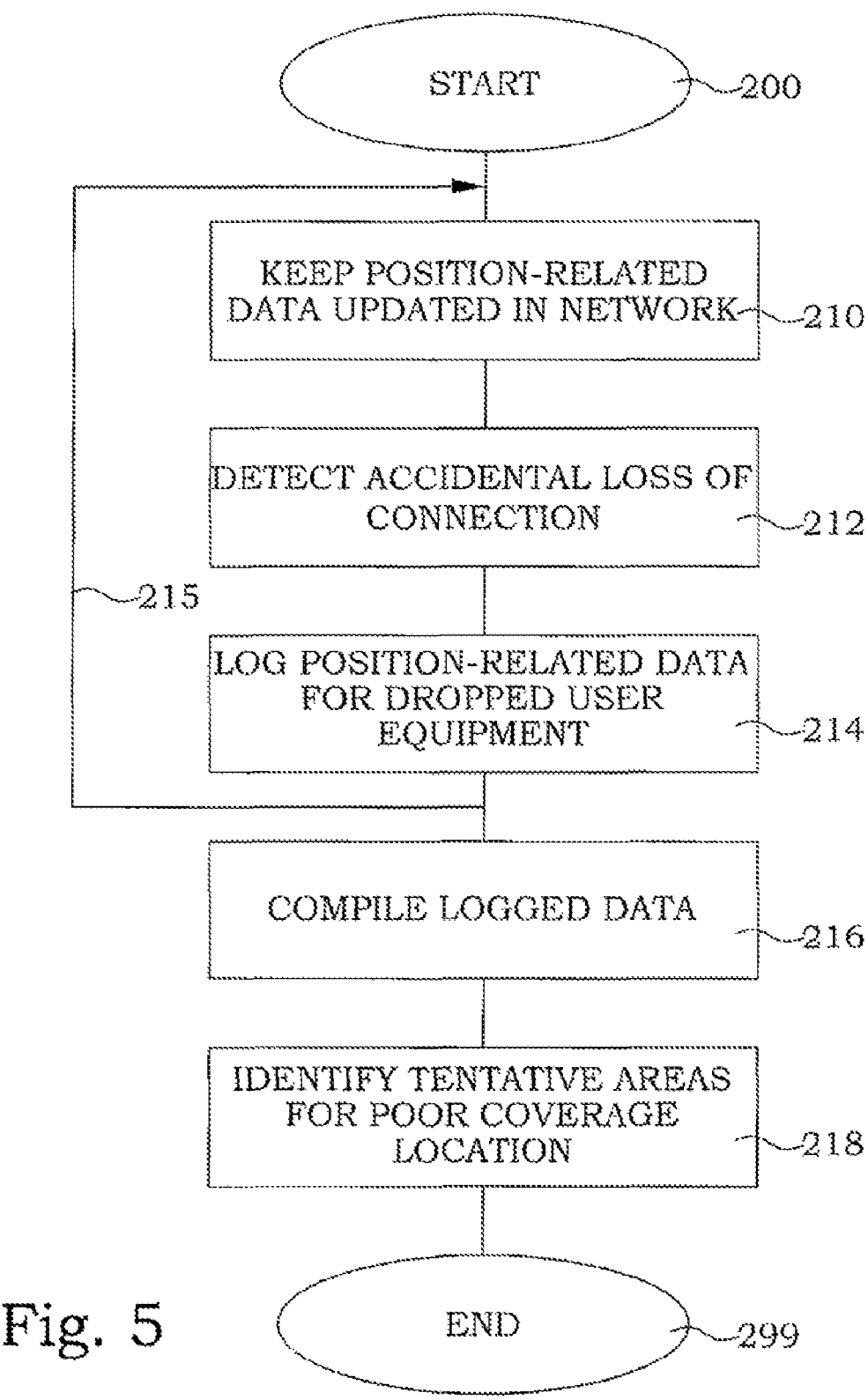
FIG. 5 illustrates a flow diagram of steps of an embodiment of a method according to the present invention.

FIG. 5 is a flow diagram illustrating an embodiment of a method according to the present invention. A method for determining tentative locations for areas with poor radio coverage in a cellular communication system starts in step 200. In step 210, position-related data of connected user equipments is kept updated in a network part of the communications system. Preferably, the position-related data is a distance-related quantity, and more preferably such a distance-related quantity is a propagation delay. An accidental loss of connection to a user equipment is detected in the network part of the communication system in step 212. In step 214, position-related data, available in the network part, of a dropped user equipment is logged as a response to such a detected accidental loss of connection of the dropped user equipment. Preferably, the logged position-related data is position-related data of a latest known position of the user equipment. The steps 210 to 214 are typically performed continuously or intermittently a number of times, as indicated by the arrow 215. The logged position-related data for a multitude of accidental loss events is compiled in step 216 as a quantity based on the number of accidental losses of connection as a function of a position-related parameter. This position-related parameter is typically directly derivable from the position-related data. In step 218, a tentative location for an area with poor radio coverage is identified by statistical evaluation of the compiled quantity. The procedure ends in step 299.

This way the network operations can use the regular subscriber traffic volume to find locations with poor radio coverage. Instead of having expensive drive test teams blindly searching for bad coverage spots, they can now limit the surveys to pinpointed areas. Furthermore, the utilization of the subscriber traffic does not influence the simultaneous performance of the UE's, e.g. in terms of increased power consumption, need for additional hardware or increased control signaling. An intra-cell problem area can now be narrowed down to a circular strip with typically a width of approximately 200 meters around the node B site. By this approach, it may be worth the efforts to chase that typical last percent of the network drop rate. The identification of the poor coverage area of the present invention is typically in most cases not precise enough to point out a specific spot, but the location indication is good enough to limit the area which has to be search for finding the actual poor coverage spot.

The compiling step is important, since it enables a distinction between accidental losses that are dependent on poor radio coverage from accidental losses being caused by other reasons. Such other reasons could be malfunctions of the UE's, e.g. loss of battery power. Accidental losses caused by "other reasons" are typically not directly dependent on the location of the UE. By collecting a certain statistical basis, non-location dependent causes for accidental loss of connection will appear as a background or smeared-out distribution. The location-dependent accidental loss of connections will instead sum up to distinct peaks in the statistical ensemble.

The most straight-forward way of compiling the drop data is to select the actual number of accidental losses of connection as the quantity to be mapped as a function of a position-related parameter. FIG. 6 illustrates such a plot, where the number of detected accidental losses of connection is illustrated as a function of a position-related parameter, in this embodiment the propagation delay. Peaks are building up at propagation delays, where poor radio coverage is present. A simple method for identification of such propagation delays is to identify positions with a value of the plotted quantity, i.e. in this embodiment the number of accidental losses of connection, as a function of the position-related parameter, i.e. in this embodiment the propagation delay, over a predetermined threshold T as a tentative location for an area with poor radio coverage. In FIG. 6, two peaks P1 and P2 are possible to identify. Each peak corresponds to a circular arc sector centered around the base station site with a radius determined by the propagation delay times the speed of light.

FIG. 7A illustrates a cell corresponding to the example of FIG. 6. A first area A1, being a circular arc sector with a radius R1 corresponding to the propagation delay of P1 (FIG. 6) can be identified as a tentative location of a poor coverage area. If no further information is available, the entire circular arc sector A1 has to be search for finding the actual poor coverage spot. In the case of P2 (FIG. 6), another radius R2 is associated. In the cell 15 of FIG. 7A, a lake 98 is present, and the circular arc sector of radius R2 intersects the lake 98. In this example, it may be very unlikely that any UE's, or at least a large number of UE's have been used at the lake area. The area to be searched for the poor coverage spot can thereby by use of additional local information be limited to two part areas A2 and A3.

In cellular communication systems, there is typically a certain degree of overlap between different neighbouring base stations. This enables e.g. handover between different node B's. This means that in some cases, there might be accidental loss of connection data for one and the same spot available from more than one base station. FIG. 7B illustrates a situation, where two circular arc sectors A4, A5 centred at different node B sites intersect. Since each of those node B sites pinpoints a poor coverage ring and the rings geographically overlap when their layouts are combined, then the precision of the tentative poor coverage location may increase to a spot S of typically 200×200 meters. Combining of data from several node B's may easily be performed in an automatic fashion on a centrally located network node.

The statistical evaluation directly on the number of accidental loss of connection can be even improved if further considerations are taken into account. The area corresponding to a certain propagation delay is larger for large propagation delays than for small propagation delays, since the length of the circle arcs increases. This means that there are generally more UE's available at the same propagation delay when the propagation delay is large. This will then also give a higher rate of accidental losses of connection being caused by other causes than poor radio coverage, and might eventually give a statistical peak that might be identified as a problem area. If the compilation therefore is normalized by a division of a quantity proportional to the propagation delay itself, a more correct statistics will result. However, attention should be taken to treat the area closest to the node B site carefully, since each drop will gain a very high weight in the statistical compiling.

Another situation which may influence the evaluation of the compiled data is if the traffic load differs considerably between different areas within the cell. For instance, places where a lot of people pass, such as shopping malls, sports arenas or transport nodes, will typically exhibit a higher rate of calls than other areas in the cell. Since accidental losses of connection not dependent on the location typically are proportional to the total number of calls, more accidental losses of connection are expected to appear in high-traffic areas. By normalizing the number of accidental loss of connection by a quantity representing the total traffic load, a more representative value can be found. The traffic load quantity can be of any type, e.g. an average traffic recorded during a test period.

One quantity that may be used as a representation of a "total traffic load" measure is the number of new connections per area. An area having a high traffic load is also expected to have a high number of new connections. This quantity has probably also some information concerning possible poor coverage, since it is unlikely that new connections are established in areas where the coverage is poor. Furthermore, upon initializing a new connection, the propagation delay and hence the distance to the node B is always determined. The logging step of the present invention therefore preferably also comprises logging of user equipment connection positions when the user equipment being connected to the cellular communication system and the compiling further comprises compiling of the user equipment connection positions as a function of a position-related parameter. By dividing the number of accidental losses of connection with the number of new connection as a function of e.g. propagation delay, i.e. a normalizing operation, areas having a high traffic load are suppressed compared to areas having lower traffic load. Areas having extremely low traffic load due to poor coverage will have both a high drop rate and a low rate of new connections, which will pronounce the peaks even more. In order to avoid division be very small numbers, the normalization is preferably performed by a measure based on an average of the user equipment connection positions as a function of a position-related parameter over a predetermined area surrounding the position defined by the position-related parameter. In other words, the normalizing factor is averaged over a larger area than the accidental loss of connection quantity.

Figure 8:
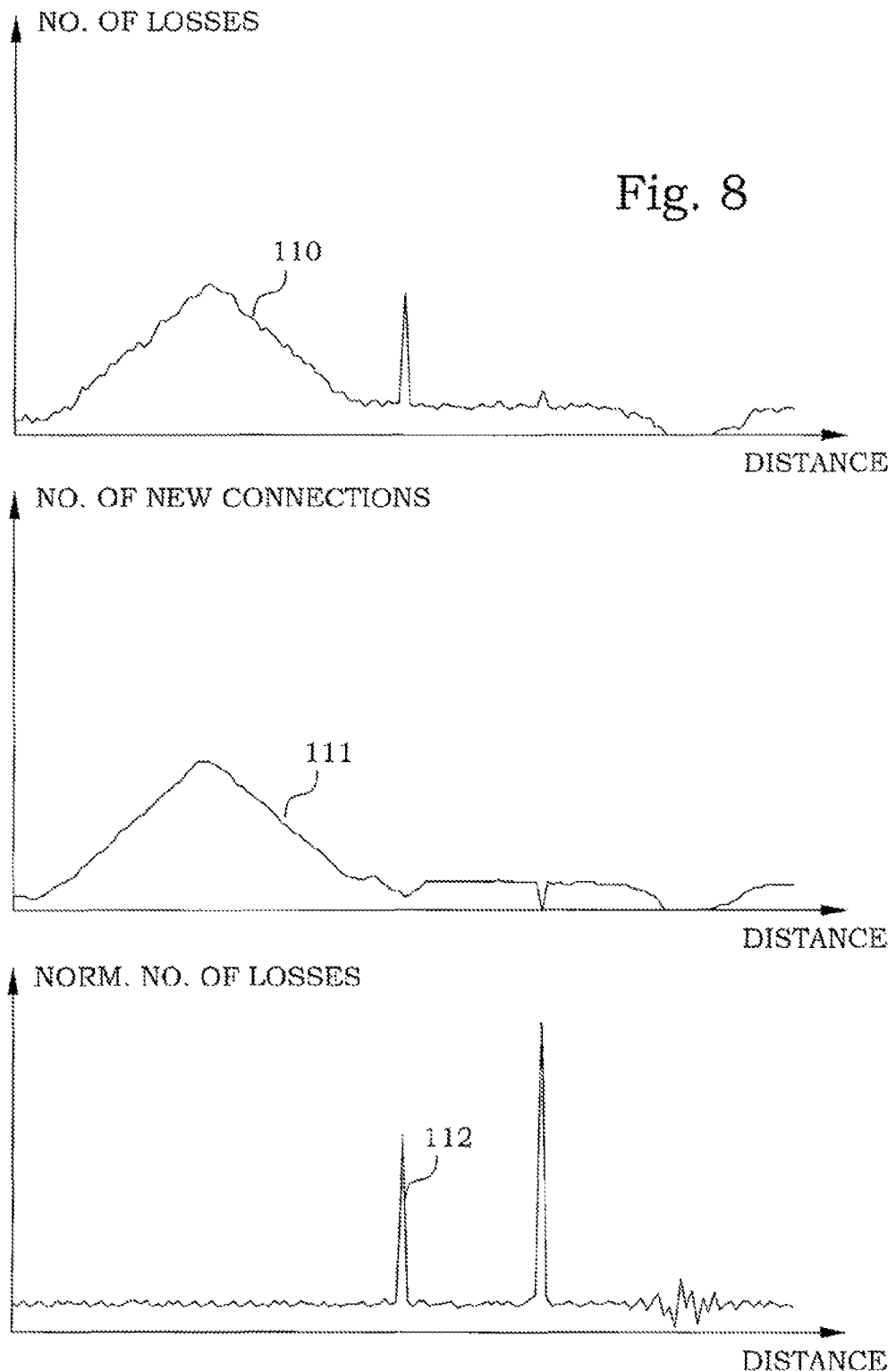
FIG. 8 are diagrams illustrating normalizing of accidental loss of connection data.

FIG. 8 presents diagrams schematically illustrating such normalizing. A curve 110 corresponds to an un-normalized distribution of call drops (i.e. accidental loss of connection), curve 111 corresponds to a distribution of new connections and curve 112 corresponds to a normalized distribution of call drops.

As mentioned above, the functionality of the present invention may be implemented in many different ways in different network part nodes. A few examples of node implementations are presented below.

Figure 9:
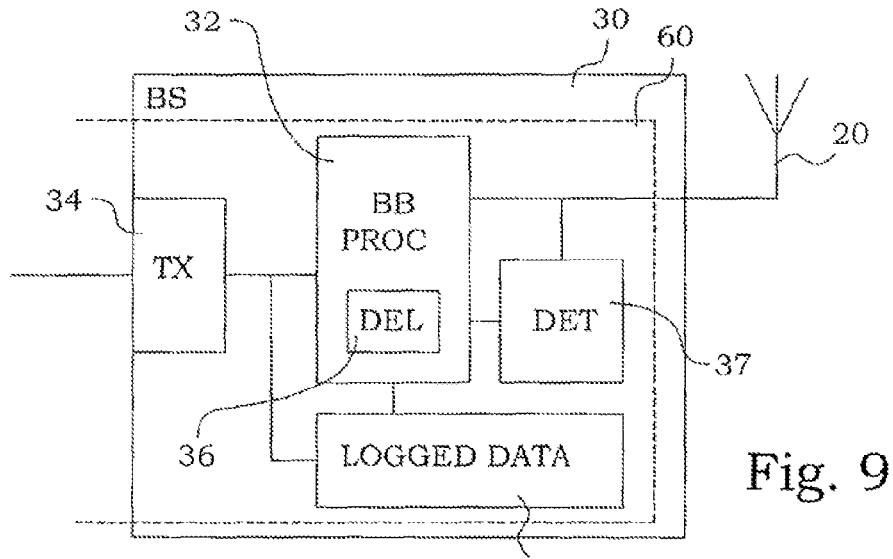
FIG. 9 is a block scheme of an embodiment of a base station according to the present invention.

FIG. 9 is a block scheme of an embodiment of a base station 30 having an arrangement 60 for assisting in providing tentative locations for areas with poor radio coverage in a cellular communication system. Note that this arrangement 60 is entirely comprised in the network part of the cellular communication system. The arrangement 60 comprises an uplink base band processor 32. The uplink base band processor 32 is further arranged for keeping position-related data of connected user equipments updated, preferably a distance-related quantity. A means 36 for keeping position-related data of connected user equipments updated can thus be seen to be integrated within the uplink base band processor 32. The updating is typically provided by tracking a propagation delay for the user equipments, and particular for tracking a representation of a coding chip of the propagation delay.

The arrangement 60 further comprises a detector 37 of accidental loss of connection to a user equipment. This detector is typically integrated with other processors in the base station 30. A means 33 for logging position-related data, typically a data storage, is connected to the means 36 for keeping position-related data updated and to the detector 37. The means 33 for logging position-related data is arranged for logging the position-related data of a dropped user equipment as a response to a detected accidental loss of connection of the dropped user equipment. The position-related data is preferably position-related data of a latest known position of said user equipment.

The means 33 for logging position-related data is preferably also arranged for logging connecting user equipment positions when the connecting user equipment is connected to he cellular communication system. This data can, as discussed above, be used for normalizing purposes.

Typically, further processing of the logged data is performed in another network part node of the cellular communication system. The present embodiment of the network part arrangement 60 therefore comprises a transmitter 34 for transmitting data representing the logged position-related data to the node within the cellular communication system having appropriate further processing or storing capacity.

Figure 10:
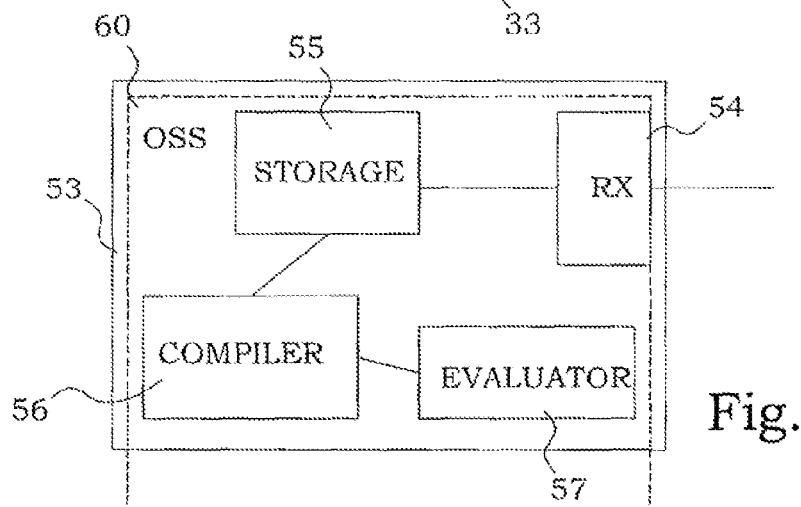
FIG. 10 is a block scheme of an embodiment of an OSS node comprising parts of an arrangement according to the present invention.

A network part node that is utilized for many O&M related tasks is the OSS node. Parts of an arrangement assisting in providing tentative locations for areas with poor radio coverage are with advantage provided an OSS node. FIG. 10 illustrates a block scheme of an embodiment of an OSS node 53 exhibiting parts of an arrangement 60 assisting in providing tentative locations for areas with poor radio coverage. The OSS node 53 comprises a receiver 54 for data representing the logged position-related data. Such data is preferable intermittently transmitted from e.g. the base station are regular occasions, e.g. as parts of regular O&M related control signaling, and is preferably stored in a data storage 55 of the OSS 53. In case of WCDMA, such signaling is preferably performed over Mub/Mu interfaces, shown further below in connection with FIG. 11. When appropriate amounts of data are stored, a compilation takes place. The OSS 53 therefore comprises a compiler 56 for compiling the logged position-related data for a multitude of accidental loss events as a quantity based on the number of accidental losses of connection as a function of a position-related parameter. The quantity is in one embodiment the actual number of accidental losses of connection as a function of said position-related parameter. The compiler 56 is in one embodiment further arranged for also compiling connecting user equipment positions as a function of a position-related parameter. The compiler 56 can thereby normalize the actual number of accidental losses of connection as a function of said position-related parameter by a measure based on the connecting user equipment positions, preferably averaged over a predetermined area surrounding the position defined by the position-related parameter.

The results from the compiler 56 may be evaluated manually. However, in the present embodiment, the OSS node 53 also comprises an evaluator 57 for identifying a tentative location for an area with poor radio coverage. The evaluator 57 is connected to the compiler 56 and arranged for statistical evaluation of the compiled quantity based on the number of accidental losses of connection as a function of the position-related parameter. Such evaluation is preferably performed according to the procedures discussed further above.

Figure 11:
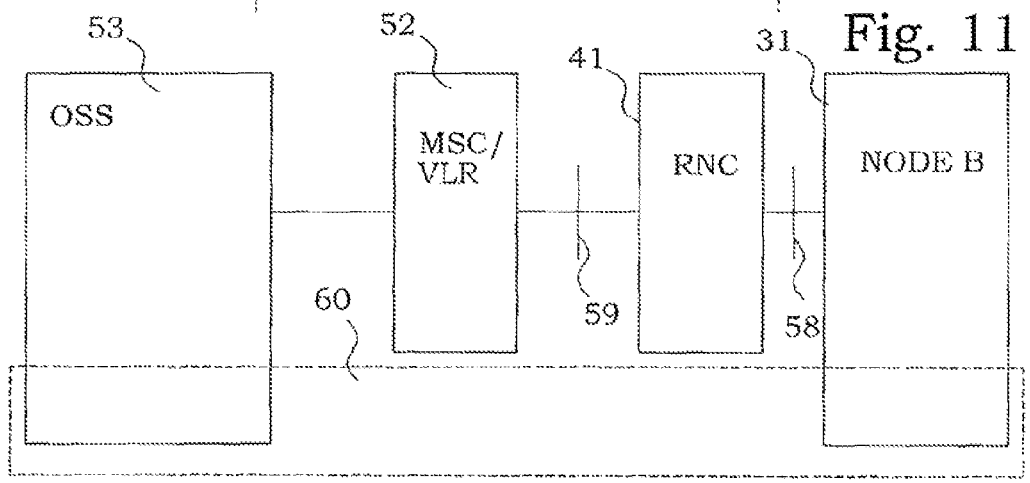
FIG. 11 is a block diagram of an embodiment of a distributed arrangement according to the present invention.

In case the arrangement for assisting in providing tentative locations for areas with poor radio coverage only comprises the means connected to the updating of position-related data and logging of dropped connections, the arrangement may easily be comprised in a single network part node, e.g. a base station, a base station controller, a node B or a radio network controller. However, if the arrangement also comprises compilation and evaluation means, it is typically advantageous that such functionality is provided higher up in the network hierarchy. The arrangement for assisting in providing tentative locations for areas with poor radio coverage then becomes a distributed arrangement involving parts of different cellular communication system nodes. FIG. 11 illustrates such a system. In the illustrated embodiment, the arrangement 60 involves parts of both the node B 31 and the OSS node 53. The intermediate nodes, e.g. the RNC 41 and the MSC/VLR 52 may be pure transit nodes which the information simply passes without causing any operations. The RNC 41 and the Node B 31 communicates over the logical O&M interface Mub 58 and the RNC 41 communicates with the core network, here illustrated by e.g. the MSC over the logical O&M interface Mu 59. However, the intermediate nodes may also be used e.g. as intermediate storages for information. In such a way, the RNC 41 or the MSC/VLR 52 can collect data from several connected node B's for a certain period of time, and when an evaluation is to be performed, e.g. in the OSS node, the data could be retrieved and sent to the OSS node 53 for compilation and evaluation. In alternative embodiments, the RNC 41 and/or the MSC/VLR 52 may also comprise parts of the arrangement 60.

The RNC 41 may in some situations be utilized for improving the quality of the positioning of tentative locations of poor coverage. In most cases, accidental drops occur in situations with only one remaining radio link, i.e. only one node B involved. In systems having soft handover, a terminal may, however, be in simultaneous contact with more than one node B. In such a case, there is a certain uncertainty about the round trip time measured e.g. by the BB UL processing. The position determination may therefore be very inaccurate. Such situations may, however, easily be excluded by assistance from the RNC. The RNC has to report to the node B that it changes from single link to multiple links. In the 3 GPP Iub Frame Protocol specification, there is an entity in a header that can be used for such "multiple-RLS indicator" purposes. RLS means Radio Link Set, which is the notation for all radio links within one node B. If the indicator is activated, another node B is simultaneously involved in the connection of the mobile terminal.

Another alternative is to involve the soft handover situation, which can be accomplished if the logging at least to a part is moved to the RNC. A measurement from the mobile terminal is demanded periodically in order to compensate the data before logging for the statistical evaluation. Dedicated signals over NBAP and RRC have to be employed. A RRC measurement control message is first sent to the terminal requesting a reception-to-transmission time measurement. Then, a NBAP dedicated measurement control message is sent to the node B to request an RTT measurement. The terminal will respond with a RRC measurement report message and the node B with a NBAP dedicated measurement report message. When the RNC has received both measurement reports, the distance value for the terminal can be calculated as half the difference between the round trip time and the reception-to-transmission time.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

Published U.S. patent application 2005/0136911.

The invention claimed is:

1. A method for determining tentative locations for areas with poor radio coverage in a cellular communication system, comprising the steps of:
keeping position-related data of connected user equipments updated in a network part of said communications system;
detecting, in said network part of said communication system, an accidental loss of connection to a user equipment;
logging said position-related data, available in said network part, of a dropped user equipment as a response to a detected said accidental loss of connection of said dropped user equipment;
compiling said logged position-related data for a multitude of accidental loss events as a normalized quantity based on the number of accidental losses of connection as a function of said position-related parameter; and identifying a tentative location (A1; A2; A3; S) for an area with poor radio coverage by statistical evaluation of said normalized quantity.

2. The Method according to claim 1, wherein said position-related data is of a latest known position of said user equipment.

3. The Method according to claim 1, wherein said quantity is the actual number of accidental losses of connection as a function of a position-related parameter.

4. The Method according to claim 1, wherein said position-related data is a distance-related quantity.

5. The Method according to claim 4, wherein said distance-related quantity is a propagation delay.

6. The. Method according to claim 5, wherein said propagation delay is achieved by uplink baseband processing.

7. The Method according to claim 5, wherein said position-related parameter is a representation of the coding chip of said propagation delay.

8. The Method according to claim 1, wherein said step of identifying identifies positions with a value of said quantity based on the number of accidental losses of connection as a function of a position-related parameter over a predetermined threshold as a tentative location (A1; A2; A3; S) for an area with poor radio coverage.

9. The Method according to claim 1, wherein said step of logging further comprises logging of user equipment connection positions when the user equipment being connected to said cellular communication system and said step of compiling further comprises compiling of said user equipment connection positions as a function of a position-related parameter.

10. The Method according to claim 9, wherein said normalized quantity based on the number of accidental losses of connection as a function of a position-related parameter is normalized by a measure based on said user equipment connection positions as a function of a position-related parameter.

11. The Method according to claim 10, wherein said normalized quantity based on the number of accidental losses of connection as a function of a position-related parameter is normalized by a measure based on an average of said user equipment connection positions as a function of a position-related parameter over a predetermined area surrounding the position defined by said position-related parameter.

12. The Method according to claim 1, wherein said step of identifying utilizes compiling logged position-related data from more than one base station for limiting an area of said tentative location (S) for an area with poor radio coverage.

13. A Network part arrangement for assisting in providing tentative locations (A1; A2; A3; S) for areas with poor radio coverage in a cellular communication system, comprising:

means for keeping position-related data of connected user equipments updated;

detector of accidental loss of connection to a user equipment;

means for logging position-related data, connected to said means for keeping position-related data updated and said detector;

said means for logging position-related data logging said position-related data of a dropped user equipment as a response to a detected said accidental loss of connection of said dropped user equipment; and means for compiling said logged position-related data for a multitude of accidental loss events as a normalized quantity based on the number of accidental losses of connection as a function of a position-related parameter.

14. The Network part arrangement according to claim 13, wherein said position-related data is position-related data of a latest known position of said user equipment.

15. The Network part arrangement according to claim 13, wherein said position-related data is a distance-related quantity.

16. The Network part arrangement according to claim 15, wherein said means for keeping position-related data is an uplink baseband processor.

17. The Network part arrangement according to claim 16, wherein said uplink baseband processor tracks a propagation delay as said position-related data.

18. The Network part arrangement according to claim 17, wherein said uplink baseband processor tracks a representation of a coding chip of said propagation delay as said position-related data.

19. The Network part arrangement according to claim 13, wherein means for logging position-related data logs connecting user equipment positions when said connecting user equipment being connected to said cellular communication system.

20. The Network part arrangement according to claim 13, further comprising means for transmitting data representing said logged position-related data to a node within said cellular communication system.

21. The Network part arrangement according to claim 13 wherein said quantity is the actual number of accidental losses of connection as a function of said position-related parameter.

22. The Network part arrangement according to claim 13, wherein said means for compiling compiles connecting user equipment positions as a function of a position-related parameter.

23. The Network part arrangement according to claim 22, wherein said means for compiling normalizes said quantity by a measure based on said connecting user equipment positions.

24. The Network part arrangement according to claim 23, wherein said normalizing is based on an average of said connecting user equipment positions as a function of a position-related parameter over a predetermined area surrounding the position defined by said position-related parameter.

25. The Network part arrangement according to claim 13, further comprising an evaluator for identifying a tentative location (A1; A2; A3; S) for an area with poor radio coverage to statistically evaluate said quantity based on the number of accidental losses of connection as a function of said position-related parameter.

26. The Network part arrangement according to claim 13, further comprising means for receiving data representing said position-related data from a node within said cellular communication system.

27. The network part arrangement according to claim 13, wherein a Cellular communication system node comprises said network part arrangement.

28. The Cellular communication system node according to claim 27, being one of:
a node B;
a radio network controller;
an operations support system node;
a base station;
a base station controller; and
a mobile switching centre.

29. The cellular communication node of claim 27 wherein a Cellular communication system, comprises at least one cellular communication node.

30. The Cellular communication system according to claim 29, being one of:
   a WCDMA system;
   a GSM system;
   a CDMA system;
   a TDMA system; and
   an OFDM system.

* * * * *